United States Patent
Su et al.

(10) Patent No.: US 11,615,524 B2
(45) Date of Patent: Mar. 28, 2023

(54) PRODUCT DEFECT DETECTION METHOD AND APPARATUS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Ye Su, Beijing (CN); Lei Nie, Beijing (CN); Jianfa Zou, Beijing (CN); Feng Huang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 163 days.

(21) Appl. No.: 17/248,053

(22) Filed: Jan. 7, 2021

(65) Prior Publication Data

US 2021/0407062 A1 Dec. 30, 2021

(30) Foreign Application Priority Data

Jun. 30, 2020 (CN) .......................... 202010612366.X (51) Int. Cl.
*G06K 9/00* (2022.01)
*G06T 7/00* (2017.01)
(Continued)

(52) U.S. Cl.
CPC ............ *G06T 7/001* (2013.01); *G06V 10/454* (2022.01); *G06V 10/48* (2022.01); *G06V 20/647* (2022.01); *G06T 2207/10016* (2013.01)

(58) Field of Classification Search
CPC ........... G06T 7/001; G06T 2207/10016; G06T 2207/10024; G06T 2207/10028;
(Continued)

(56) References Cited

U.S. PATENT DOCUMENTS

2018/0211373 A1 * 7/2018 Stoppa ................. G06V 20/653
2018/0322623 A1 11/2018 Memo et al.
(Continued)

FOREIGN PATENT DOCUMENTS

CN 109087274 A 12/2018
CN 110378900 A 10/2019

OTHER PUBLICATIONS

Chen G., et al., "Self-Calibrating Deep Photometric Stereo Networks," IEEE/CVF Conference on Computer Vision and Pattern Recognition (CVPR), Jun. 15, 2019, XP033687404, 9 pages.
(Continued)

*Primary Examiner* — Samir A Ahmed
(74) *Attorney, Agent, or Firm* — Banner & Witcoff, Ltd.

(57) ABSTRACT

A product defect detection method and apparatus, an electronic device, and a storage medium are provided. A method includes: acquiring a multi-channel image of a target product; inputting the multi-channel image to a defect detection model, wherein the defect detection model includes a plurality of convolutional branches, a merging module and a convolutional headbranch; performing feature extraction on each channel in the multi-channel image by using the plurality of convolutional branches, to obtain a plurality of first characteristic information; merging the plurality of first characteristic information by using the merging module, to obtain second characteristic information; performing feature extraction on the second characteristic information by using the convolutional headbranch, to obtain third characteristic information to be output by the defect detection model; and determining defect information of the target product based on the third characteristic information.

12 Claims, 4 Drawing Sheets

(51) Int. Cl.
*G06V 10/44* (2022.01)
*G06V 10/48* (2022.01)
*G06V 20/64* (2022.01)

(58) Field of Classification Search
CPC .... G06V 10/454; G06V 10/48; G06V 20/647; G06V 10/806; G06V 10/82; G01N 2021/8883; G01N 2021/8887; G01N 21/8851; G06N 3/0454
See application file for complete search history.

(56) References Cited

U.S. PATENT DOCUMENTS

| | | | |
|---|---|---|---|
| 2019/0096135 A1* | 3/2019 | Dal Mutto | G06T 7/0006 |
| 2019/0108396 A1* | 4/2019 | Dal Mutto | G06V 20/52 |
| 2019/0108678 A1* | 4/2019 | Hazeghi | H04N 5/33 |
| 2020/0126210 A1 | 4/2020 | Li | |

OTHER PUBLICATIONS

Extended European Search Report for Application No. EP21164862.1, dated Sep. 21, 2021, 11 pages.
Herbort S., et al., "An Introduction to Image-Based 3D Surface Reconstruction and a Survey of Photometric Stereo Methods," 3D Research Center, Sep. 1, 2011, vol. 2, No. 3, XP055591223A, 17 pages.
Su H., et al., "Multi-view Convolutional Neural Networks for 3D Shape Recognition," IEEE International Conference on Computer Vision, Dec. 7, 2015, XP032866419A, 9 pages.
Office action for Japanese Application No. 2021001835, dated Mar. 23, 2022, 9 pages.

* cited by examiner

PRODUCT DEFECT DETECTION METHOD AND APPARATUS, ELECTRONIC DEVICE AND STORAGE MEDIUM

CROSS-REFERENCE TO RELATED APPLICATION

This application claims priority to Chinese Patent Application No. 202010612366.X, filed on Jun. 30, 2020, which is hereby incorporated by reference in its entirety.

TECHNICAL FIELD

The present application relates to the technical field of computer, and more particularly to the fields of computer vision, image processing, deep learning, cloud computing, and the like.

BACKGROUND

In the conventional industrial manufacturing scenarios, such as the manufacture of components and parts of computer, communication and consumer electronic products, detection of surface conditions of the products is vital for the manufacturer to control the out-going quality and maintain production relationship.

SUMMARY

A product defect detection method and apparatus, an electronic device, and a storage medium are provided according to embodiments of the application.

In an aspect, a product defect detection method is provided according to an embodiment of the application, which includes:

acquiring a multi-channel image of a target product;

inputting the multi-channel image to a defect detection model, wherein the defect detection model includes a plurality of convolutional branches, a merging module and a convolutional headbranch;

performing feature extraction on each channel in the multi-channel image by using the plurality of convolutional branches, to obtain a plurality of first characteristic information;

merging the plurality of first characteristic information by using the merging module, to obtain second characteristic information;

performing feature extraction on the second characteristic information by using the convolutional headbranch, to obtain third characteristic information to be output by the defect detection model; and determining defect information of the target product based on the third characteristic information.

In another aspect, a product defect detection apparatus is provided according to an embodiment of the application, which includes:

an acquisition module configured to acquire a multi-channel image of a target product;

an input module configured to input the multi-channel image to a defect detection model, wherein the defect detection model includes a plurality of convolutional branches, a merging module and a convolutional headbranch;

a branch processing module configured to perform feature extraction on each channel in the multi-channel image by using the plurality of convolutional branches, to obtain a plurality of first characteristic information;

a branch merging module configured to merge the plurality of first characteristic information by using the merging module, to obtain second characteristic information;

a headbranch processing module configured to perform feature extraction on the second characteristic information by using the convolutional headbranch, to obtain third characteristic information to be output by the defect detection model; and a determination module configured to determine defect information of the target product based on the third characteristic information.

In another aspect, an electronic device is provided according to an embodiment of the application, which includes:

at least one processor; and a memory communicatively connected to the at least one processor, wherein the memory stores instructions executable by the at least one processor, wherein the instructions, when executed by the at least one processor, enable the at least one processor to perform the method according to any embodiment of the present application.

In another aspect, a non-transitory computer readable storage medium having stored thereon computer instructions is provided according to an embodiment of the application, wherein the computer instructions cause a computer to perform the method according to any embodiment of the present application.

It is intended to understand that the content described in this part is not intended to identify the key or important features of embodiments of the present application, nor to limit the scope of the present application. Other features of the present application will become easy to be understood through the following description.

BRIEF DESCRIPTION OF THE DRAWINGS

The appended drawings are intended to provide a better understanding of the application and constitute a part of the specification, which, in conjunction with the embodiments of the present application, are used to illustrate the specification and should not be construed as limiting the scope of present application, wherein.

DETAILED DESCRIPTION

The following, with reference to the accompanying drawings, illustrates the exemplary embodiments of the application, wherein various details of the embodiment of the application are included to help understanding, and the details are considered to be merely illustrative. Therefore, ordinary skilled people in the art should recognize that various changes and modifications can be made to the embodiments described herein without departing from the scope and spirit of the application. Similarly, for clarity and conciseness, descriptions of known functions and structures are omitted in the following description.

Figure 1:
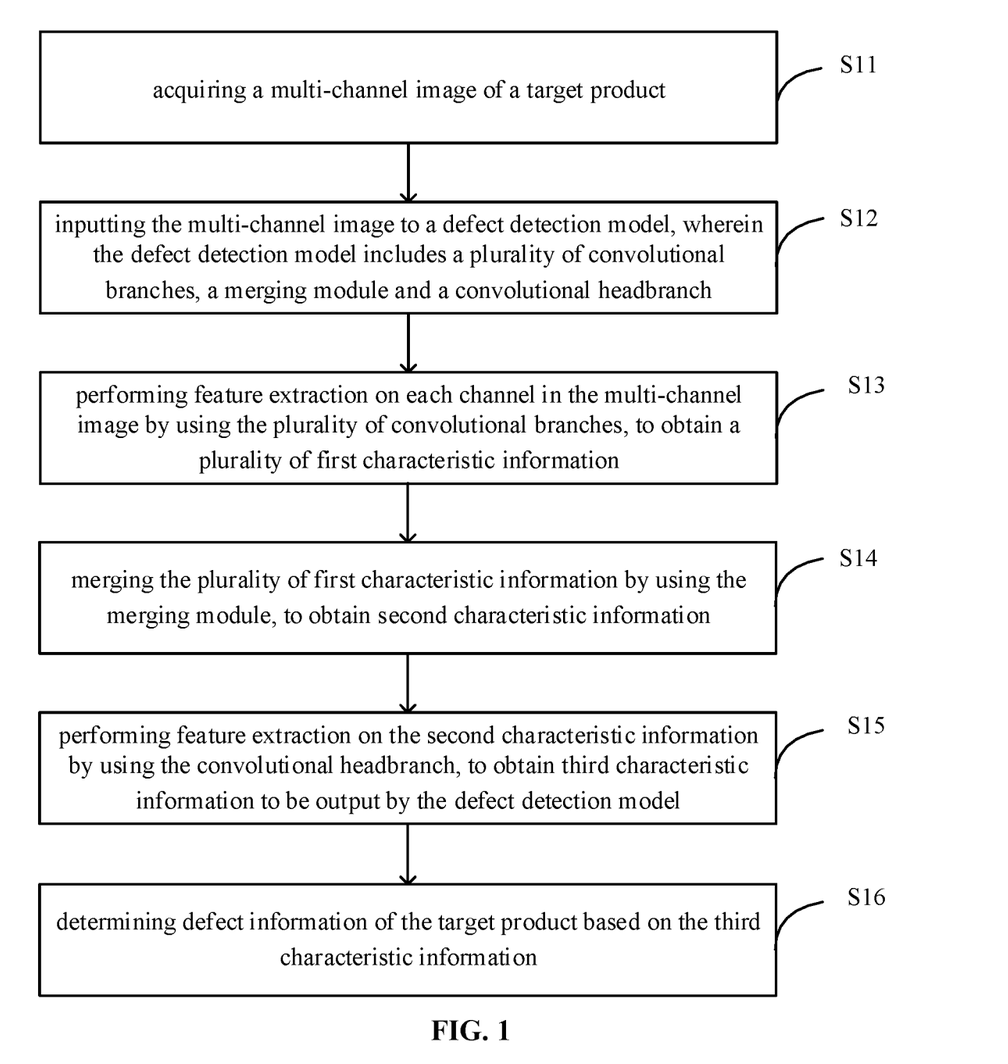
FIG. 1 is a schematic diagram of a product defect detection method according to an exemplary embodiment of the present application.

FIG. 1 is a schematic diagram of a product defect detection method according to an exemplary embodiment of the present application. As shown in FIG. 1, the method includes S11-S16.

At S11, a multi-channel image of a target product is acquired.

The target product may refer to a product to be detected for a defect in the industrial manufacturing industry. The multi-channel image may refer to an image including characteristic information of a plurality of channels, for example, a color image including a red feature value, a green feature value, and a blue feature value of the target product. In some embodiments, other characteristic information of the target product, such as three-dimensional information, etc., may also be used as the characteristic information of one or more image channels, to obtain the multi-channel image.

At S12, the multi-channel image is input to a defect detection model, wherein the defect detection model includes a plurality of convolutional branches, a merging module and a convolutional headbranch.

In an embodiment of the present application, the defect detection model may be trained based on a convolutional neural network. The number of convolutional branches of the defect detection model may be the same as the number of channels of the multi-channel image described above. For example, if the defect detection model is used to process a 6-channel image, the defect detection model includes 6 convolutional branches. Alternatively, the number of each of the convolutional module and the merging module in the defect detection model may be one.

At S13, feature extraction is performed on each channel in the multi-channel image by using the plurality of convolutional branches, to obtain a plurality of first characteristic information.

The characteristic information of each channel in the multi-channel image is input to each convolutional branch for processing. Each convolutional branch may include one or more convolutional layers. As an example, each convolutional branch may use a convolutional layer to perform feature extraction on the input information, to achieve the effect of enhancing a feature associated with a product defect in a corresponding channel. Optionally, each convolutional branch may include one or more convolutional layers, such as an up-sampling layer, a down-sampling layer, a fully connected layer, etc.

A network structure of each convolutional branch may be determined based on a framework such as a residual network (resnet), a U-net network, and a Fully Convolutional Network (FCN). After each convolutional branch processes characteristic information of a channel, first characteristic information with a plurality of channels can be obtained.

The number of channels of the first characteristic information output by each convolutional branch is related to the network structure of the corresponding convolutional branch and a parameter of each convolutional layer in the convolutional branch. The network structures of the convolutional branches may be the same or different. For example, for different types of characteristic information, different network structures may be employed to directionally extract features.

At S14, the plurality of first characteristic information are merged by using the merging module, to obtain second characteristic information.

For example, the merging module performs channel integration on a plurality of multi-channel first characteristic information to obtain one multi-channel second characteristic information. For example, the number of channels of each first characteristic information is 256, and channels of 5 first characteristic information are aggregated as 256×5=1280 channels of second characteristic information, some of which may be merged to obtain, by way of example, second characteristic information with the number of channels less than 1280.

At S15, feature extraction is performed on the second characteristic information by using the convolutional headbranch, to obtain third characteristic information to be output by the defect detection model.

The convolution headbranch may include one or more convolutional layers for performing feature extraction on the second characteristic information obtained by merging. Optionally, the convolutional headbranch may include one or more convolutional layers such as an upsampling layer, a downsampling layer, and a full connection layer. The convolutional headbranch may be determined based on a framework such as a resnet, a U-net network, and a FCN. The third characteristic information output by the convolutional headbranch can be used as characteristic information to be output by the defect detection model.

At S16, defect information of the target product is determined based on the third characteristic information.

For example, the third characteristic information may be image information that enhances the defect information. Based on the third characteristic information, the defect information of the target product may be determined. Alternatively, the defect information of the target product may include location information where a defect occurs, a size of the defect, a type of the defect, etc. For example, a pixel location in the third characteristic information where a feature value is larger than a threshold value is determined as a location of a defect, a size, a shape, etc. of the defect is determined based on the location of the defect, and the type of the defect is determined according to the size, the shape, and the size of the defect.

According to the present embodiment, the problem of misdetection easily caused by manual visual inspection or semi-automatic optical instrument assisted quality inspection and inconvenience of storing and using the inspection results is solved by acquiring a multi-channel image of the target product, and determining the defect information of the target product using the multi-channel image and the defect detection model. The image of the target product is a multi-channel image, a plurality of features of the target product are recorded, and the defect detection model performs feature extraction on each of a plurality of channels using a plurality of convolutional branches, merges the outputs of the plurality of convolutional branches and extracts the merged feature using the convolutional headbranch, so the model uses not only the individual characteristic information of each channel but also the correlation information between the channels to the full extent. Therefore, with the solution according to the present embodiment, it is possible to enhance the merging effect of the plurality of features, improve the utilization rate of the plurality of features of the target product, and improve the defect detection accuracy.

Figure 2:
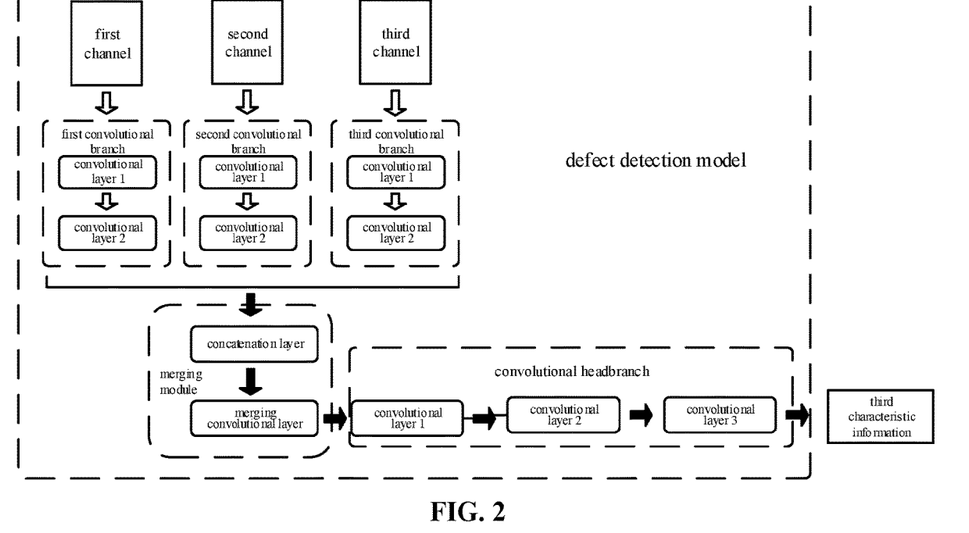
FIG. 2 is a schematic diagram of a defect detection model according to an exemplary embodiment of the present application.

For example, as shown in FIG. 2, the defect detection model may include a first convolutional branch, a second convolutional branch, a third convolutional branch, a merging module, and a convolutional headbranch.

After a three-channel image is input to the defect detection model, first, the characteristic information of the first channel, the second channel, and the third channel are respectively input to three convolutional branches. In the example shown in FIG. 2, the first convolutional branch performs feature extraction on the first channel, the second convolutional branch performs feature extraction on the second channel, and the third convolutional branch performs feature extraction on the third channel. Each of the convolutional branches outputs one first characteristic information. Then, the merging module merges three first characteristic information to obtain second characteristic information, and outputs the second characteristic information to the convolutional headbranch. The convolutional headbranch processes the merged second characteristic information to output third characteristic information as the output information of the defect detection model.

Illustratively, as shown in FIG. 2, a concatenation layer and a merging convolutional layer may be included in the merging module. In S14 above, merging the plurality of first characteristic information by using the merging module, to obtain the second characteristic information, includes:

performing channel concatenation on the plurality of first characteristic information by using a concatenation layer in the merging module, to obtain fourth characteristic information; and performing channel alignment on the fourth characteristic information by using the merging convolutional layer in the merging module, to obtain the second characteristic information with a standardized channel number.

For example, if first characteristic information output from each convolutional branch has 512 channels, then the concatenation layer is used to perform channel concatenation on three first characteristic information to obtain fourth characteristic information with 512×3=1536 channels. Since 1536 is not a standardized channel number, the merging convolutional layer is used to perform channel alignment on the fourth characteristic information with 1536 channels to obtain second characteristic information with the standardized channel number of 512.

According to the exemplary embodiment, the merging convolutional layer not only merges the plurality of first characteristic information but also aligns them to the second characteristic information with the standardized channel number, which can facilitate implementation of the convolutional headbranch using the standardized network architecture, reduce the development difficulty and improve the accuracy of the model.

Figure 3:
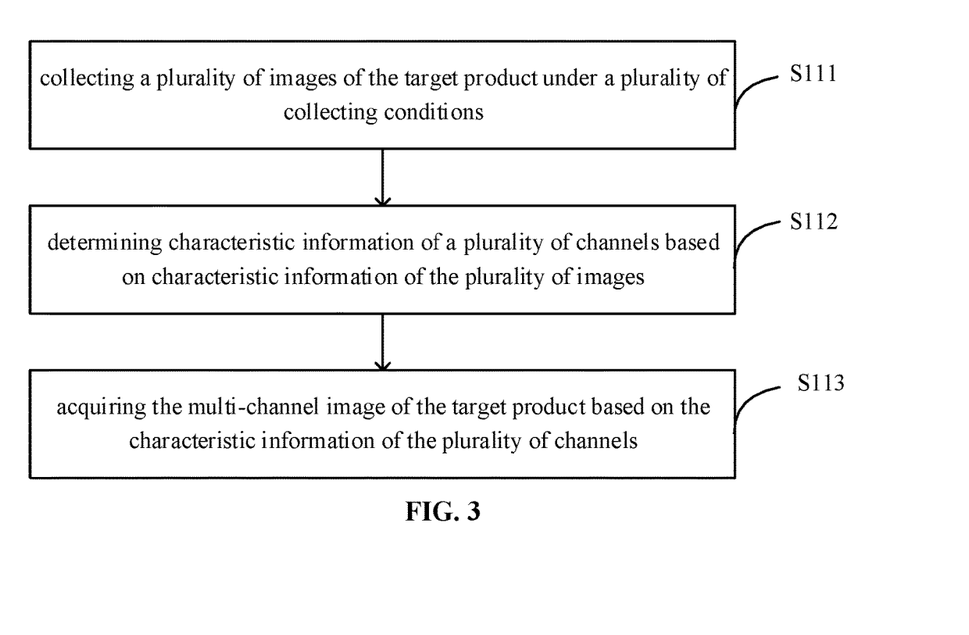
FIG. 3 is a schematic diagram of a product defect detection method according to an exemplary embodiment of the present application.

In an exemplary embodiment, as shown in FIG. 3, in S11, acquiring the multi-channel image of the target product, includes:

S111, collecting a plurality of images of the target product under a plurality of collecting conditions;

S112, determining characteristic information of a plurality of channels based on the characteristic information of the plurality of images; and S113, acquiring the multi-channel image of the target product based on the characteristic information of the plurality of channels.

For example, for a product to be detected for a defect, a plurality of images can be collected by an image collecting apparatus such as a camera under different types of light source illumination at different angles. If the characteristic information of the plurality of images is used as the characteristic information of the plurality of channels, a multi-channel image can be obtained. For example, under light source illumination at five different angles, five images of a target product are collected to obtain a five-channel image.

As an example, predefined processing may also be performed on the characteristic information of the plurality of images, so that the characteristic information of the plurality of images is converted to the same distribution area, for example, [0,255], [0,1], etc. The characteristic information obtained by the predefined processing is used as the characteristic information of the plurality of channels. The predefined processing is, for example, equalization, normalization.

For example, the characteristic information of the plurality of images may be used to be combined with other information of the target product, to obtain characteristic information of more channels, thereby obtaining a more-channel image. For example, 5 images of the target product are collected, 2 features of the target product are additionally acquired, and thus characteristic information of 7 channels is obtained as characteristic information of respective channels in a 7-channel image.

According to this exemplary embodiment, the characteristic information of the collected multiple images is used as the characteristic information of some or all of the channels in the multi-channel image, and then a defect detection model is used to detect the multi-channel image, which can effectively gather the multi-angle and multi-dimensional information of the target product. Compared with using multiple models to detect multiple images respectively, this can detect the defect information of the target product more quickly and accurately.

In an exemplary embodiment, in S112 described above, determining the characteristic information of the plurality of channels based on the characteristic information of the plurality of images, includes:

calculating three-dimensional information of the target product based on the plurality of images and an optical flow stereo network; and taking the characteristic information of the plurality of images and the three-dimensional information as the characteristic information of the plurality of channels.

The three-dimensional information may also be referred to as 3D information.

For example, 5 images of the target product are collected, 1 type of 3-dimensional information of the target product, such as the product surface depth of a certain pixel point in an image, is additionally obtained from the plurality of images, and thus 6 types of characteristic information are obtained, on which processing such as equalization, normalization, etc. is performed to obtain characteristic information of 6 channels, and hence a 6-channel image can be obtained.

According to the exemplary embodiment, using three-dimensional information of the target product as partial channel information in the multi-channel image, the accuracy of product defect detection can be improved.

Optionally, the plurality of images of the target product may be images collected from the same angle by a camera at the same position under different light source illumination conditions, so as to calculate the three-dimensional information of the target product in the same pixel coordinate system, and further to improve the accuracy.

Optionally, the optical flow stereo network includes a light calibration network and a normal calculation network. The three-dimensional information includes depth information calculated by the light calibration network and surface inclination angle information calculated by the normal calculation network.

Calculation of images captured from same angle at the same position under a plurality of light source conditions using the light calibration network may obtain depth information of a product in the images such as the surface depth and height of the product. Calculation of images captured from same angle at the same position under a plurality of light source conditions using the normal calculation network may obtain the surface inclination angle of the product in the images.

Since the target product can be reconstructed using the depth information and the surface inclination angle information of the target product, the exemplary embodiment can effectively improve the detection accuracy by performing defect detection on the target product in combination with the depth information and the surface inclination angle information.

Figure 4:
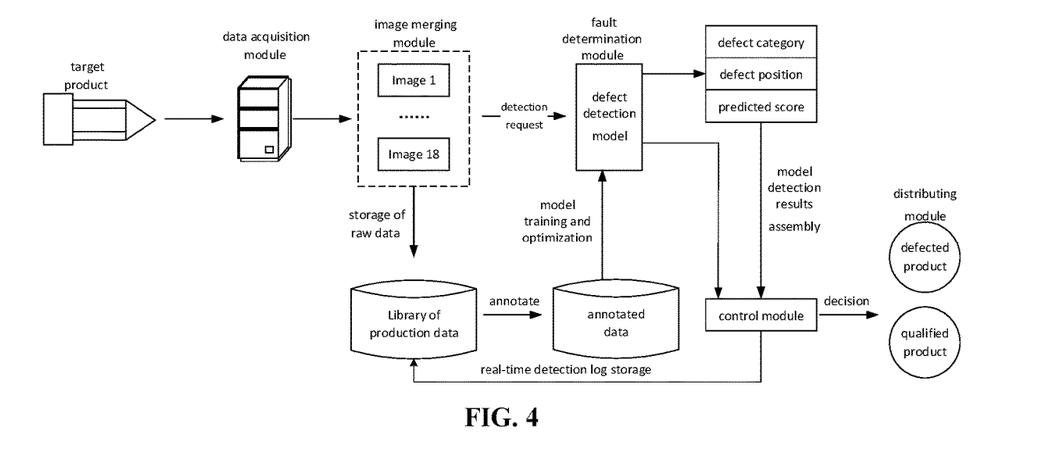
FIG. 4 is an application scenario diagram in which an embodiment of the present application may be implemented.

FIG. 4 is an application scenario diagram where a product defect detection method according to an embodiment of the present application may be implemented. The method may realize the detection of a defect in a product based on multiple images. In the specific implementation, multiple images of a product under different types of illumination conditions at different angles are collected respectively by an industrial camera set up through an automated mechanical equipment according to a pre-designed light source scheme. The defect in the product is detected based on the input images, and then the product is put into a corresponding offload box by means of a robot arm according to the detection result.

As shown in FIG. 4, the product defect detection method may be implemented using the following modules:

a data collection module (Camera), configured to collect multiple images or a video of a product under different types of light source illumination conditions at different angles respectively by an automated mechanical equipment;

an image merging module (Collector), configured to merge the multiple images or multiple frames of the video of the product at a channel level, in combination with a visual enhancement technique, e.g. to perform S111 to S113 above, to achieve information aggregation, wherein in FIG. 4, 18 images are taken as an example;

a fault determination module (Predictor), configured to perform defect detection on an image in a prediction query on an electronic device through an artificial intelligent visual algorithm such as a defect detection model as provided in an embodiment of the present application, to obtain defect information of the product, such as a defect category, a defect location, and a prediction score characterizing an accuracy of the detection result, and return the model detection result;

a control module (controller), configured to cooperate with the data collection module, schedule initiation and termination operations of a prediction task, predict the initiation operation of the prediction task, accept the prediction result, and complete a distributing operation; and a distributing module (Distributor), configured to distribute a real object corresponding to the part or product by an automatic equipment according to the final prediction result of the decision system.

In this scenario, the control module first sends a service startup instruction to all the computing nodes including the above-mentioned modules according to the product quality inspection requirement. The instruction is loaded on each computing node. The artificial intelligence algorithm model is used to construct the fault determination module. After the model is started and warmed up, the data collection module starts to take continuous photos of the product to be inspected through an automatic equipment, converts the pictures of the product generated in real time at different angles and the related production information into a fault prediction query, and sends the prediction query to the control module. After receiving the prediction query, the control module performs an initiation operation, sends the query and scheduling instruction information to a designated computing node such as an image merging module. The image merging module performs merging processing on the input information and sends the merged image along with the prediction query to the fault determination module, which will predict the model in the query, output the fault determination result and send it to the control module.

After receiving the failure determination result, the control module generates a final distributing decision and then send the distributing decision information to the distributing module for distribution of the product, and meanwhile make a response that meets the requirement of the production environment scenario, e.g., give an alarm, store production data, etc.

As shown in FIG. 4, the control module stores a real-time detection log into a production database, and the image merging module stores raw data, such as raw images, into the production database, and annotates data in the production database. The annotated data may be used to retrain and optimize the defect detection model. It can be seen that the method according to the embodiment of the present application facilitates storage, management, and re-use of the detected data.

To sum up, the method according to the embodiment of the present application solves the problem of misdetection easily caused by manual visual inspection or semi-automatic optical instrument assisted quality inspection and inconvenience of storing and using the inspection results by obtaining a multi-channel image of the target product, and determining the defect information of the target product by using the multi-channel image and the defect detection model. The image of the target product is a multi-channel image, a plurality of features of the target product are recorded; and the defect detection model performs feature extraction on each of the plurality of channels by using a plurality of convolutional branches, merges the outputs of the plurality of convolutional branches and then extracts the merged features by using the convolutional headbranch, so that the model uses not only the individual characteristic information of each channel but also the correlation information between each channel to the full extent. Therefore, the method according to the embodiment of the present application can be implemented to enhance merging of the plurality of features, improve the utilization of the plurality of features of the target product, and improve the defect detection accuracy.

Figure 5:
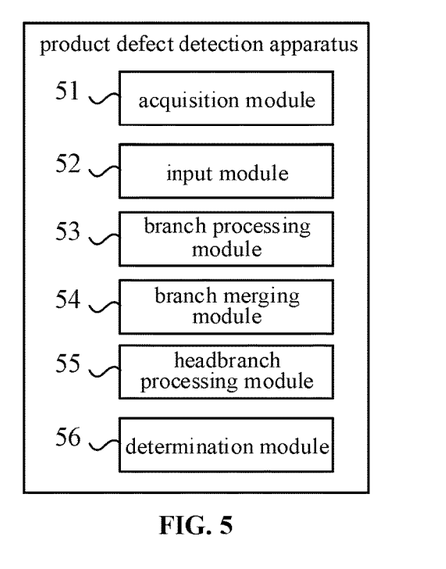
FIG. 5 is a schematic diagram of a product defect detection apparatus according to an exemplary embodiment of the present application.

FIG. 5 is a schematic diagram of a product defect detection apparatus according to an exemplary embodiment of the present application. As shown in FIG. 5, the apparatus includes:

an acquisition module 51 configured to acquire a multi-channel image of a target product;

an input module 52 configured to input the multi-channel image to a defect detection model, wherein the defect detection model includes a plurality of convolutional branches, a merging module and a convolutional headbranch;

a branch processing module 53 configured to perform feature extraction on each channel in the multi-channel image by using the plurality of convolutional branches, to obtain a plurality of first characteristic information;

a branch merging module 54 configured to merge the plurality of first characteristic information by using the merging module, to obtain second characteristic information;

a headbranch processing module 55 configured to perform feature extraction on the second characteristic information by using the convolutional headbranch, to obtain third characteristic information to be output by the defect detection model; and a determination module 56 configured to determine defect information of the target product based on the third characteristic information.

Figure 6:
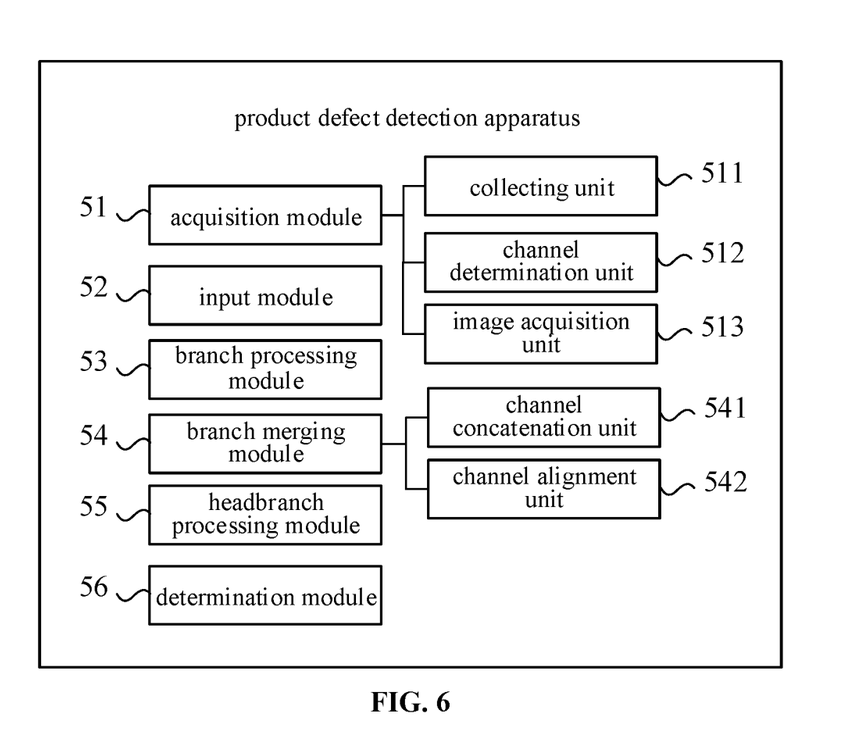
FIG. 6 is a schematic diagram of a product defect detection apparatus according to an exemplary embodiment of the present application.

In one embodiment, as shown in FIG. 6, the acquisition module 51 includes:

a collecting unit 511 configured to collect a plurality of images of the target product under a plurality of collecting conditions;

a channel determination unit 512 configured to determine characteristic information of a plurality of channels based on characteristic information of the plurality of images; and an image acquisition unit 513 configured to acquire the multi-channel image of the target product based on the characteristic information of the plurality of channels.

In one embodiment, as shown in FIG. 6, the channel determination unit 512 includes:

a calculation subunit configured to calculate three-dimensional information of the target product based on the plurality of images and an optical flow stereo network; and a determination subunit configured to take the characteristic information of the plurality of images and the three-dimensional information as the characteristic information of the plurality of channels.

In an embodiment, the optical flow stereo network includes a light calibration network and a normal calculation network; and the three-dimensional information includes depth information calculated by the light calibration network and surface inclination angle information calculated by the normal calculation network.

In one embodiment, the branch merging module 54 includes:

a channel concatenation unit 541 configured to perform channel concatenation on the plurality of first characteristic information by using a concatenation layer in the merging module, to obtain fourth characteristic information; and a channel alignment unit 542 configured to perform channel alignment on the fourth characteristic information by using a merging convolutional layer in the merging module, to obtain the second characteristic information with a standardized channel number.

The apparatus according to the embodiments of the present application is capable of implementing the method according to the embodiments of the present application and has the corresponding advantageous effects.

An electronic device and a readable storage medium are provided according to embodiments of the present application.

Figure 7:
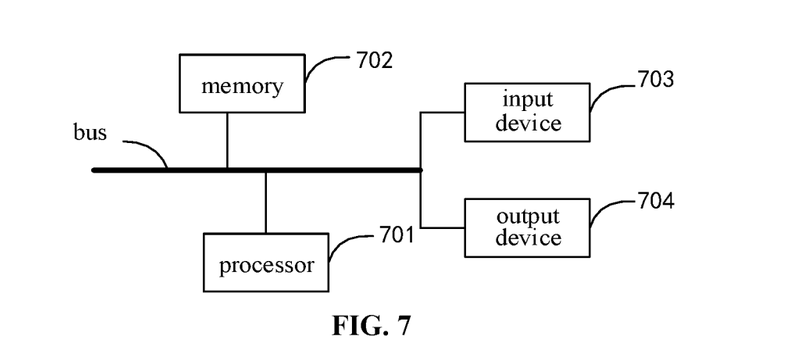
FIG. 7 is a block diagram of an electronic device used to implement the product defect detection method according to an embodiment of the present application.

FIG. 7 is a block diagram of an electronic device to implement a product defect detection method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cell phones, smart phones, wearable devices, and other similar computing devices. The components, their connections and relationships, and their functions shown herein are by way of example only and are not intended to limit the implementations of the present application described and/or claimed herein.

As shown in FIG. 7, the electronic device includes one or more processors 701, a memory 702, and interfaces for connecting the components, including a high-speed interface and a low-speed interface. The components are interconnected using different buses, and may be mounted on a common motherboard or otherwise mounted as desired. The processors may process instructions executing within the electronic device, including instructions stored in memory or on memory to display graphical information of the GUI on an external input/output device, such as a display device coupled to the interface. In other implementations, multiple processors and/or multiple buses may be used with multiple memories and multiple memories, if desired. Also, multiple electronic devices may be connected, each providing some of the necessary operations (e.g., as a server array, a group of blade servers, or a multi-processor system). One processor 701 is taken for example in FIG. 7.

The memory 702 is a non-transitory computer readable storage medium as provided herein. The memory stores instructions executable by at least one processor to cause the at least one processor to perform a method of detecting product defects as provided herein. The non-transitory computer readable storage medium stores computer instructions for causing a computer to perform a product defect detection method as provided herein.

The memory 702 is a non-transitory computer readable storage medium, which may be used to store the non-transitory software programs, the non-transitory computer executable programs and modules, such as the corresponding program instructions/modules (for example, the acquisition module 51, the input module 52, the branch processing module 53, the branch merging module 54, the headbranch processing module 55 and the determination module 56 as shown in FIG. 5) corresponding to the product defect detection method according to the embodiment of the application. The Processor 701 performs various functional applications and data processing of the server by running non-transitory software programs, instructions, and modules stored in the memory 702, that is, implementing the product defect detection method according to the above embodiment.

The memory 702 may include a storage program area and a storage data area, wherein the storage program area may store applications required by the operating system and at least one function; and the storage data area may store data created based on the use of the electronic device for product defect detection, etc. In addition, the memory 702 may include a high-speed random access memory and may also include a non-transitory memory, such as at least one disk storage device, flash memory device, or other non-transitory solid state storage devices. In some embodiments, the memory 702 optionally includes a memory set up remotely relative to the processor 701, which may be connected to an electronic device for product defect detection over a network. Examples of the network include, but are not limited to, the Internet, an intranet, a local area network, a mobile communications network and their combinations.

The electronic device for the product defect detection method may further include an input device 703 and an output device 704. The processor 701, the memory 702, the input device 703, and the output device 704 may be connected by bus or other means, as an example of connecting by bus in FIG. 7.

The input device 703 may receive inputted numeric or character information and generate key signal inputs relating to user settings and function control of the electronic device for product defect detection, such as an input device for a touch screen, keypad, mouse, trackpad, touchpad, pointing stick, one or more mouse buttons, trackball, joystick, etc. output device 704 may include a display device, auxiliary lighting means (e.g., LEDs), haptic feedback means (e.g., vibration motors), etc. the display device may include, but is not limited to, a Liquid Crystal Display (LCD), a Light Emitting Diode (LED) display, and a plasma display. In some embodiments, the display device may be a touch screen.

Various implementations of the systems and techniques described herein may be implemented in digital electronic circuitry, integrated circuitry, application specific ASICs (application specific integrated circuits), computer hardware, firmware, software, and/or combinations thereof. These various implementations may include implementation in one or more computer programs that are executable and/or interpretable on a programmable system including at least one programmable processor, which may be a special or general purpose programmable processor, which may receive data and instructions from, and transmit data and instructions to, a storage system, at least one input device, and at least one output device.

These computer programs (also known as programs, software applications, or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In order to provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component, e.g., as a data server, or that includes a middleware component, e.g., an application server, or that includes a front-end component, e.g., a user computer having a graphical user interface or a web browser through which a user can interact with an implementation of the systems and techniques described here, or any combination of such back-end, middleware, or front-end components. The components of the system can be interconnected by any form or medium of digital data communication, e.g., a communication network. Examples of communication networks include a Local Area Network (LAN), a Wide Area Network (WAN), and the Internet.

The computer systems may include clients and servers. A client and server are generally remote from each other and typically interact through a communication network. The relationship of client and server arises by running computer programs on the respective computers and having a client-server relationship to each other. A server, which may be a cloud server, also known as a cloud computing server or cloud host, is a host product of the cloud computing service architecture to address the deficiencies of traditional physical host and Virtual Private Server (VPS) services with great management difficulty and low business scalability.

According to the technical solution of the present embodiment, the problem of misdetection easily caused by manual visual inspection or semi-automatic optical instrument assisted quality inspection and inconvenience of storing and using the inspection results is solved by acquiring a multi-channel image of the target product, and determining the defect information of the target product using the multi-channel image and the defect detection model. The image of the target product is a multi-channel image, a plurality of features of the target product are recorded, and the defect detection model performs feature extraction on each of a plurality of channels using a plurality of convolutional branches, merges the outputs of the plurality of convolutional branches and extracts the merged feature using the convolutional headbranch, so the model uses not only the individual characteristic information of each channel but also the correlation information between the channels to the full extent. Therefore, with the solution according to the present embodiment, it is possible to enhance the merging effect of the plurality of features, improve the utilization rate of the plurality of features of the target product, and improve the defect detection accuracy.

It is to be understood that the steps may be reordered, added, or deleted using the various forms of the processes shown above. For example, the steps described herein may be performed in parallel or sequentially or in a different order, and are not limited herein so long as the desired results of the disclosed techniques are achieved.

The above-described embodiments are not to be construed as limiting the scope of the present application. It will be apparent to those skilled in the art that various modifications, combinations, sub-combinations and substitutions may be made, depending upon design requirements and other factors. Any modifications, equivalents and improvements made within the spirit and principles of the present application are intended to be included within the scope of this application.

The invention claimed is:

1. A product defect detection method, comprising:
   acquiring a multi-channel image of a target product;
   inputting the multi-channel image to a defect detection model, wherein the defect detection model comprises a plurality of convolutional branches, a merging module, and a convolutional headbranch;
   performing feature extraction on each channel in the multi-channel image by using the plurality of convolutional branches, to obtain a plurality of first characteristic information;

merging the plurality of first characteristic information by using the merging module, to obtain second characteristic information;
performing feature extraction on the second characteristic information by using the convolutional headbranch, to obtain third characteristic information to be output by the defect detection model; and
determining defect information of the target product based on the third characteristic information,
wherein the merging the plurality of first characteristic information by using the merging module, to obtain the second characteristic information comprises:
performing channel concatenation on the plurality of first characteristic information by using a concatenation layer in the merging module, to obtain fourth characteristic information; and
performing channel alignment on the fourth characteristic information by using a merging convolutional layer in the merging module, to obtain the second characteristic information with a standardized channel number.

2. The method of claim 1, wherein the acquiring the multi-channel image of the target product comprises:
collecting a plurality of images of the target product under a plurality of collecting conditions;
determining characteristic information of a plurality of channels based on characteristic information of the plurality of images; and
acquiring the multi-channel image of the target product based on the characteristic information of the plurality of channels.

3. The method of claim 2, wherein the determining the characteristic information of the plurality of channels based on the characteristic information of the plurality of images comprises:
calculating three-dimensional information of the target product based on the plurality of images and an optical flow stereo network; and
taking the characteristic information of the plurality of images and the three-dimensional information as the characteristic information of the plurality of channels.

4. The method of claim 3, wherein the optical flow stereo network comprises a light calibration network and a normal calculation network, and the three-dimensional information comprises depth information calculated by the light calibration network and surface inclination angle information calculated by the normal calculation network.

5. A product defect detection apparatus, comprising:
at least one processor, and
a memory communicatively connected to the at least one processor, wherein
the memory stores instructions executable by the at least one processor, and the instructions, when executed by the at least one processor, enable the at least one processor to perform operations comprising:
acquiring a multi-channel image of a target product;
inputting the multi-channel image to a defect detection model, wherein the defect detection model comprises a plurality of convolutional branches, a merging module and a convolutional headbranch;
performing feature extraction on each channel in the multi-channel image by using the plurality of convolutional branches, to obtain a plurality of first characteristic information;
merging the plurality of first characteristic information by using the merging module, to obtain second characteristic information;
performing feature extraction on the second characteristic information by using the convolutional headbranch, to obtain third characteristic information to be output by the defect detection model; and
determining defect information of the target product based on the third characteristic information,
wherein the merging the plurality of first characteristic information by using the merging module, to obtain the second characteristic information comprises:
performing channel concatenation on the plurality of first characteristic information by using a concatenation layer in the merging module, to obtain fourth characteristic information; and
performing channel alignment on the fourth characteristic information by using a merging convolutional layer in the merging module, to obtain the second characteristic information with a standardized channel number.

6. The apparatus of claim 5, wherein the acquiring the multi-channel image of the target product comprises:
collecting a plurality of images of the target product under a plurality of collecting conditions;
determining characteristic information of a plurality of channels based on characteristic information of the plurality of images; and
acquiring the multi-channel image of the target product based on the characteristic information of the plurality of channels.

7. The apparatus of claim 6, wherein the determining the characteristic information of the plurality of channels based on the characteristic information of the plurality of images comprises:
calculating three-dimensional information of the target product based on the plurality of images and an optical flow stereo network; and
taking the characteristic information of the plurality of images and the three-dimensional information as the characteristic information of the plurality of channels.

8. The apparatus of claim 7, wherein the optical flow stereo network comprises a light calibration network and a normal calculation network, and the three-dimensional information comprises depth information calculated by the light calibration network and surface inclination angle information calculated by the normal calculation network.

9. A non-transitory computer readable storage medium having stored thereon computer instructions, wherein the computer instructions cause a computer to perform operations comprising:
acquiring a multi-channel image of a target product;
inputting the multi-channel image to a defect detection model, wherein the defect detection model comprises a plurality of convolutional branches, a merging module and a convolutional headbranch;
performing feature extraction on each channel in the multi-channel image by using the plurality of convolutional branches, to obtain a plurality of first characteristic information;
merging the plurality of first characteristic information by using the merging module, to obtain second characteristic information;
performing feature extraction on the second characteristic information by using the convolutional headbranch, to obtain third characteristic information to be output by the defect detection model; and
determining defect information of the target product based on the third characteristic information, wherein the merging the plurality of first characteristic information by using the merging module, to obtain the second characteristic information comprises:

performing channel concatenation on the plurality of first characteristic information by using a concatenation layer in the merging module, to obtain fourth characteristic information; and performing channel alignment on the fourth characteristic information by using a merging convolutional layer in the merging module, to obtain the second characteristic information with a standardized channel number.

10. The storage medium of claim 9, wherein the acquiring the multi-channel image of the target product comprises:

collecting a plurality of images of the target product under a plurality of collecting conditions;

determining characteristic information of a plurality of channels based on characteristic information of the plurality of images; and acquiring the multi-channel image of the target product based on the characteristic information of the plurality of channels.

11. The storage medium of claim 10, wherein the determining the characteristic information of the plurality of channels based on the characteristic information of the plurality of images comprises:

calculating three-dimensional information of the target product based on the plurality of images and an optical flow stereo network; and taking the characteristic information of the plurality of images and the three-dimensional information as the characteristic information of the plurality of channels.

12. The storage medium of claim 11, wherein the optical flow stereo network comprises a light calibration network and a normal calculation network, and the three-dimensional information comprises depth information calculated by the light calibration network and surface inclination angle information calculated by the normal calculation network.

* * * * *